Patented June 3, 1941

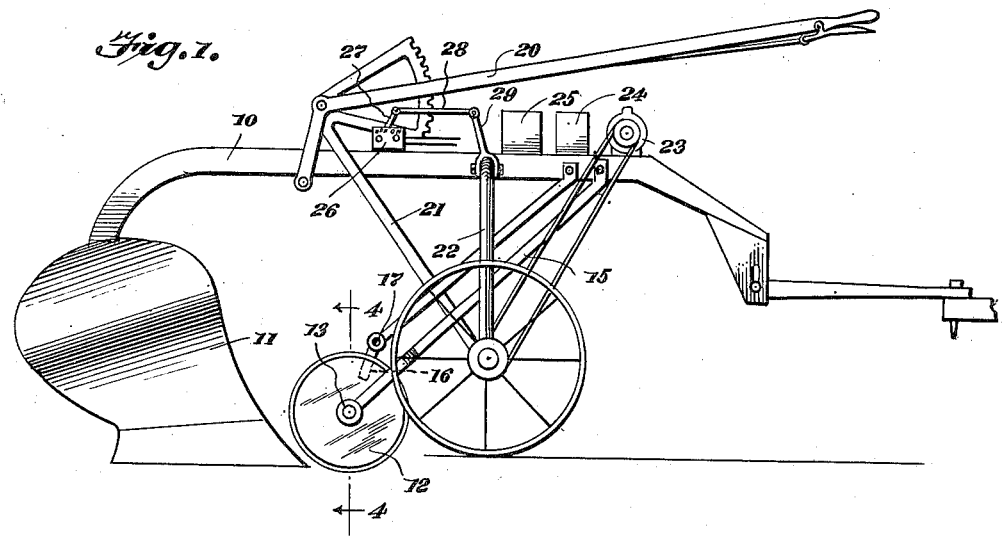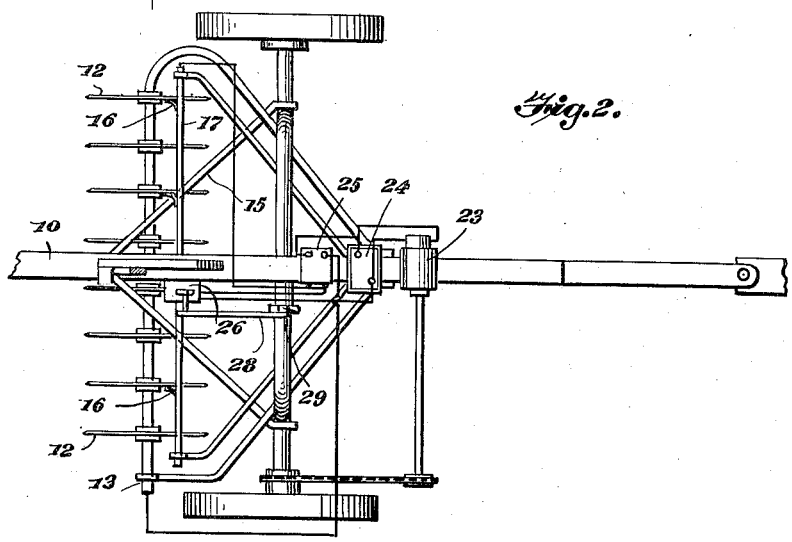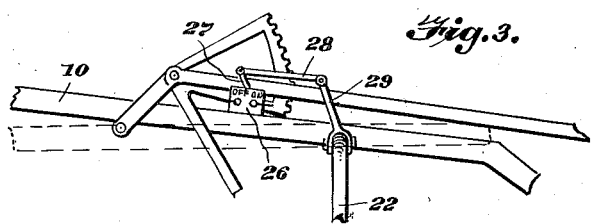

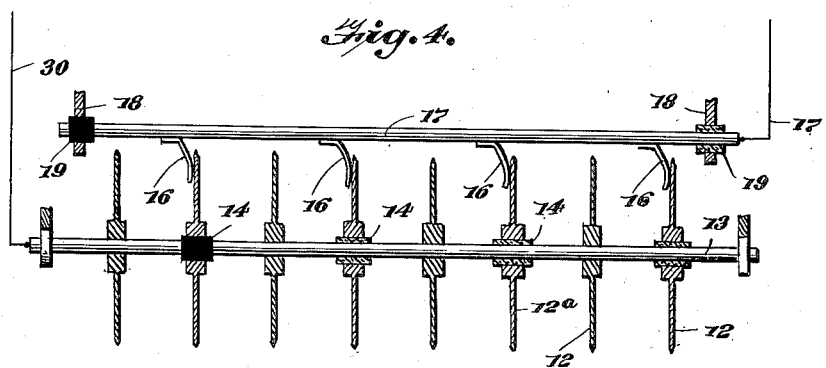
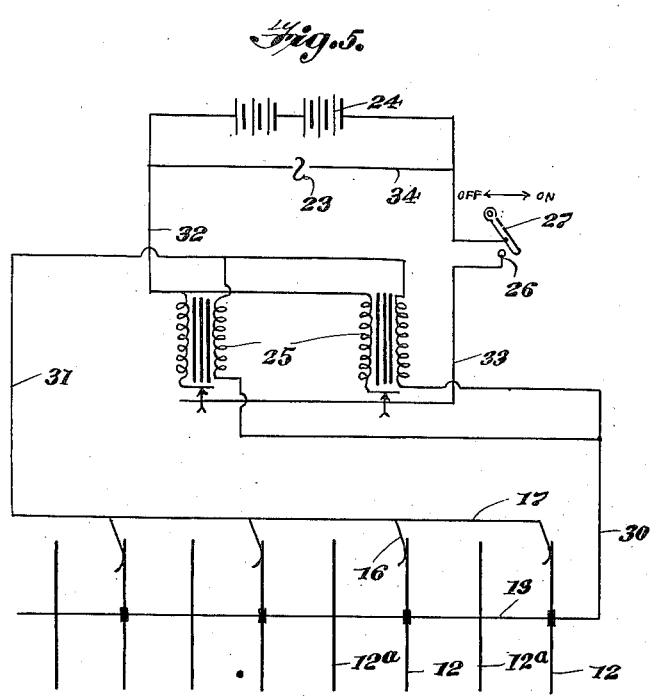
Inventor
RUSSELL TOPEL
DAVID D. BURROWS

2,243,891

UNITED STATES PATENT OFFICE 2,243,891

APPARATUS FOR DESTROYING VEGETATION AND INSECTS

Russell Topel, West Allis, and David D. Burrows, Milwaukee, Wis.

Application June 16, 1939, Serial No. 279,578

2 Claims. (Cl. 47—1.3)

This invention relates to an apparatus for exterminating all types of harmful or detrimental vegetable matter above the soil, and of various forms of vegetable and insect matter below the surface of the soil, by means of an artificially induced combustion of said detrimental matter or materials.

A further object of this invention is the production of a simple and efficient means for introducing an electrical arc into the matter above and below the surface of the soil by means of a high tension electrical current arcing between specially constructed discs, which are used as electrodes.

Another object of this invention is the production of a simple and efficient means for automatically cutting off the supply of current through the discs when the supporting beam is elevated to an inoperative position.

Other objects and advantages of the present invention will appear throughout the following specification and claims.

In the drawings:

Figure 1 is a side elevational view of the apparatus;

Figure 2 is a top plan view, a portion of the beam being broken away;

Figure 3 is a fragmentary side elevational view of the beam, showing the automatic switch carried thereby;

Figure 4 is a vertical sectional view taken on line 4—4 of Figure 1;

Figure 5 is a diagrammatic view of the electrical circuits employed in connection with the present invention.

By referring to the drawings, it will be seen that 10 designates the conventional beam which carries the conventional plow 11. A bank of discs 12 and 12a are arranged in spaced relation and extend in a vertical plane and also face in a straight forward direction and are carried by a shaft 13. Each alternate disc 12 is grounded upon the shaft 13, and the remaining alternate discs 12a are insulated from the shaft 13 by means of insulated collars 14, as shown in Figure 4. The shaft 13 is suspended from the beam 10 by means of the conventional hanger frame 15. The discs 12a are engaged by brushes 16 which are carried by a conducting bar 17, which bar is insulated from the hanger 18 as indicated at 19.

A conventional lifting lever 20 is supported by the frame 21 and engages the beam 10 in the conventional manner. The beam 10 is pivotally supported for vertical swinging movement upon the axle 22 also in the conventional manner, so that the rear end of the beam 10 may be elevated by pressing downwardly upon the lever 20, as is common in the usual type of well-known agricultural implement which may be attached to a tractor or other draft means.

In carrying out my invention, a generator 23 is preferably mounted upon the beam 10 in the manner shown in Figure 1, together with a battery 24 and a high tension coil 25. A single-pole single throw switch 26 of conventional design is carried by the beam 10 at the rear of the axle 22 and this switch 26 is provided with an upstanding operating arm 27 which is pivotally connected to a forwardly extending link 28. The forward end of the link 28 is pivotally connected to the upper end of the upstanding arm 29 which is fixed to the axle 22, as shown in Figure 3.

As shown in Figure 5, one side of the coil or coils 25 is connected to the shaft 13 by a conducting wire 30, and the bar 17 is electrically connected to the opposite side of the coil or coils 25 by a wire 31. The coils 25 are in turn connected on one side to the battery or batteries 24 by a wire 32 and to the opposite side of the coils 25 through the switch 26 by wire 33. The generator 23 is connected to the battery 24 in the conventional manner by means of the wire 34.

By considering the drawings and particularly Figure 4, it will be noted that the discs 12 and 12a are knife-like in construction and cut through the soil in a manner similar to that of a disc harrow, and may be used as such if desired. The discs cut the soil in a straight line rather than at an angle to the surface and to the direction of the motion of the harrow. In view of the fact that an electrical arc is introduced into the matter above and below the surface of the soil by means of a high tension electric current arcing between the specially constructed discs which constitute electrodes the electrical arc being of sufficient amperage, an efficient combustion will be provided to destroy types of harmful vegetable matter above the soil and various forms of vegetable and insect matter below the surface of the soil. Furthermore, the arc of high tension current will be distributed evenly over the surface of the electrodes or discs rather than only just below the surface of the soil. By noting particularly Figure 4, it will be seen that the discs used as anodes are insulated from the shaft such as the discs 12a, while the cathodes are grounded to the common shaft such as the discs 12. Both sets of electrodes run parallel to each other and extend directly perpendicular to the surface of the soil. It has been found that the arc between the electrodes consists of approximately three individual discharges per second.

The current flowing from the electrodes is automatically turned on or off through the medium of the switch 26 and upstanding arm 27 which forms a part thereof. As the beam 10 is raised or lowered the current is carried to the anodes by multiple brushes 16 supplied by a battery 24 discharging 12 volts into a plurality of high frequency generators or coils 25 which supply a high frequency current to the discs 12a. The battery or batteries 24 are kept fully charged by means of a low frequency generator 23 which may be driven in the conventional manner, or as shown in the drawings. It should be understood that the various electrical elements may be connected in the conventional manner through the medium of a conventional electrical hook-up.

By considering particularly Figure 3, it will be noted that the arm 29 is rigidly secured to the axle 22 and as the lever 20 is swung downwardly the beam 10 will be raised from the dotted position to the full line position in Figure 3, causing the switch arm 27 to be swung rearwardly from the position shown in Figure 1 to the position shown in Figure 3, or in other words from an on to an off position. Consequently, as the beam 10 is raised and the discs 12 are raised out of contact with the ground or soil the current passing through the discs will be automatically broken through the medium of the actuation of the switch 26. When the beam is raised, the switch handle or arm 27 is forced through an arc of approximately four inches from an "on" to an "off" position, and when the beam 10 is lowered, the switch arm 27 is automatically returned to the closed or on position.

The present invention not only relates to an apparatus for, but also provides a method of destroying harmful animal and vegetable matter by passing an arc through said matter both above and below the surface of the soil.

What we claim is:

1. An apparatus of the class described comprising a rotating cultivating means, a cultivator-carrying means, an axle supporting the cultivator-carrying means, the cultivator-carrying means being mounted for vertical swinging movement upon the axle, means for passing a high tension arc through the rotating cultivating means, said last mentioned means comprising a source of electrical supply, a high tension coil electrically connected to a source of electrical supply, brushes for forming a continuous electrical connection between the high tension coils and the rotating cultivating means, a switch for controlling the passage of current through the coil and rotating cultivating means, and means for automatically breaking the circuit through said switch as said cultivator-carrying means is vertically swung upon said axle.

2. An apparatus of the class described comprising a rotating cultivating means, a cultivator-carrying means, an axle supporting the cultivator-carrying means, the cultivator-carrying means being mounted for vertical swinging movement upon the axle, means for passing a high tension arc through the rotating cultivating means, said last mentioned means comprising a source of electrical supply, a high tension coil electrically connected to a source of electrical supply, brushes for forming a continuous electrical connection between the high tension coils and the rotating cultivating means, a switch carried by said cultivator-carrying means and having an upstanding arm, a link connected to said arm, a rigid arm carried by the axle and extending upwardly and connected to the opposite end of said link, in a manner whereby said switch arm will be swung to an open position to break the circuit through said switch as said cultivator-carrying means is swung vertically to move the rotating cultivating means out of contact with the surface of the soil which is being cultivated.

RUSSELL TOPEL.
DAVID D. BURROWS.